United States Patent
Terane

Patent Number: 6,134,349
Date of Patent: Oct. 17, 2000

[54] DEVICE AND METHOD FOR PROCESSING RUN-LENGTH ENCODED SIGNALS BY USING AN ADDRESS GENERATOR

[75] Inventor: Hideyuki Terane, Itami, Japan

[73] Assignee: Mitsubishi Denki Kabushiki Kaisha, Tokyo, Japan

[21] Appl. No.: 08/356,966

[22] Filed: Dec. 16, 1994

[30] Foreign Application Priority Data

Mar. 29, 1994 [JP] Japan .................................. 6-059078

[51] Int. Cl.[7] ........................................................ G06K 9/36
[52] U.S. Cl. ............................................. 382/233; 382/246
[58] Field of Search .................................... 382/246, 233, 382/245; 358/261.1, 427, 261.4

[56] References Cited

U.S. PATENT DOCUMENTS

| | | | |
|---|---|---|---|
| 4,939,583 | 7/1990 | Tsuboi et al. ............................. | 382/246 |
| 5,142,380 | 8/1992 | Sakagami et al. ....................... | 358/432 |
| 5,184,229 | 2/1993 | Saito et al. ............................... | 358/432 |
| 5,416,854 | 5/1995 | Fukuda et al. ........................... | 382/232 |

*Primary Examiner*—Andrew W. Johns
*Attorney, Agent, or Firm*—Oblon, Spivak, McClelland, Maier & Neustadt, P.C.

[57] ABSTRACT

Multiplications in an inverse quantization portion (202) are limited to only multiplications of an effective coefficient (NZ) by a quantization coefficient (Qi) corresponding thereto. An inverse zigzag transform is performed such that fixed values "0", the number of which corresponds to a block of Huffman codes, are previously arranged and the effective coefficient (NZ) is then overwritten in corresponding positions, rather than arranging data including the fixed values "0" and the effective coefficient (NZ). Thus, multiplications of ineffective coefficients are not required and the Huffman codes are decoded at a high speed.

11 Claims, 11 Drawing Sheets

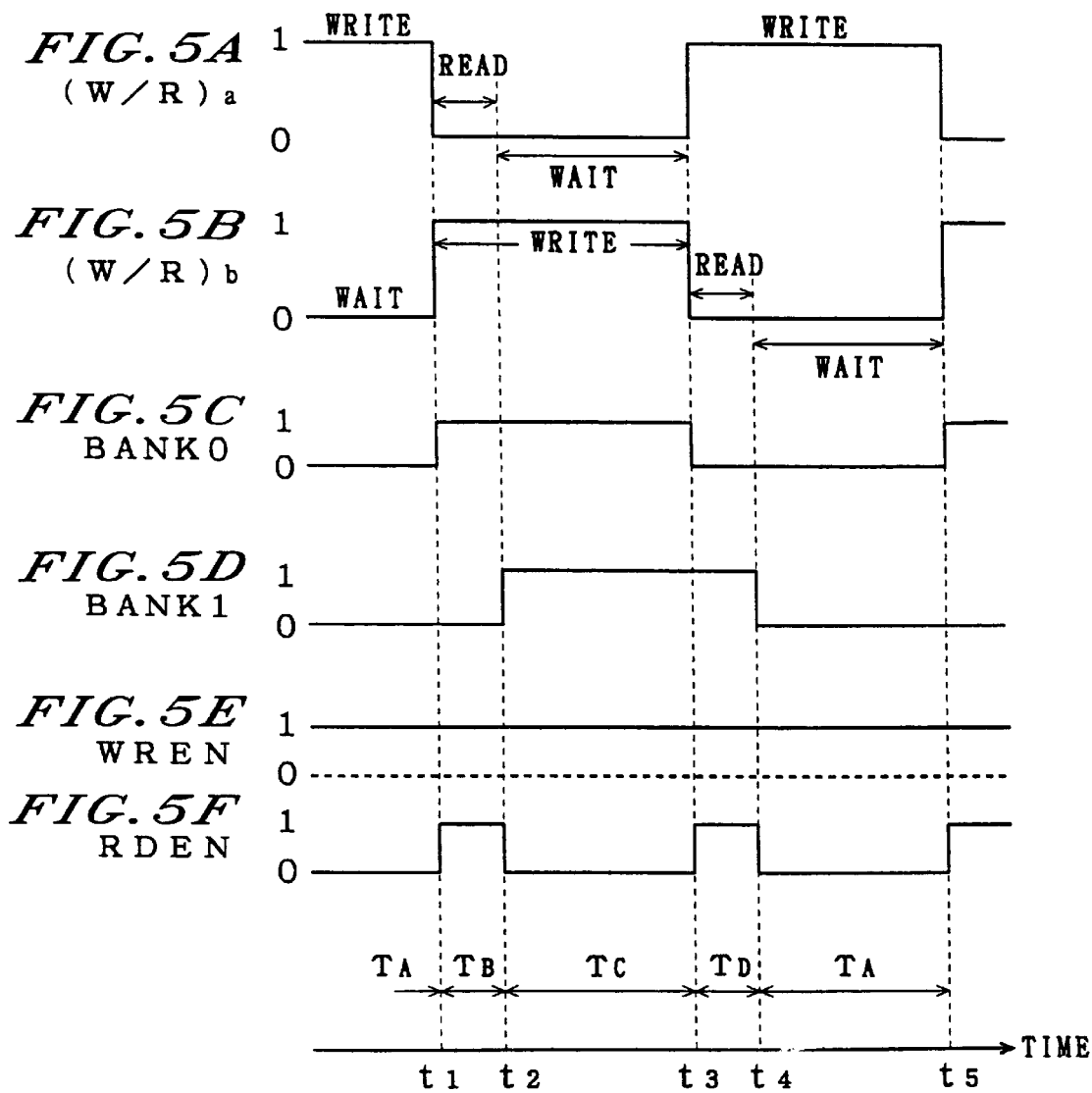

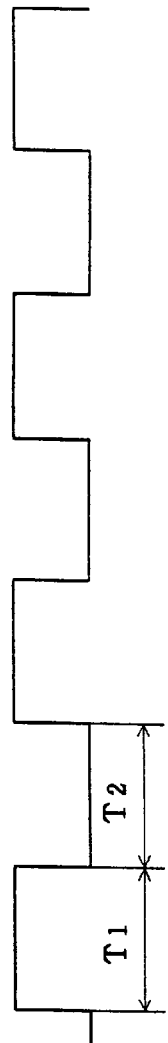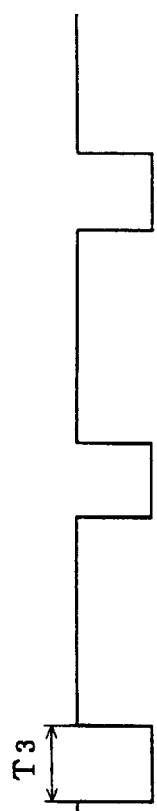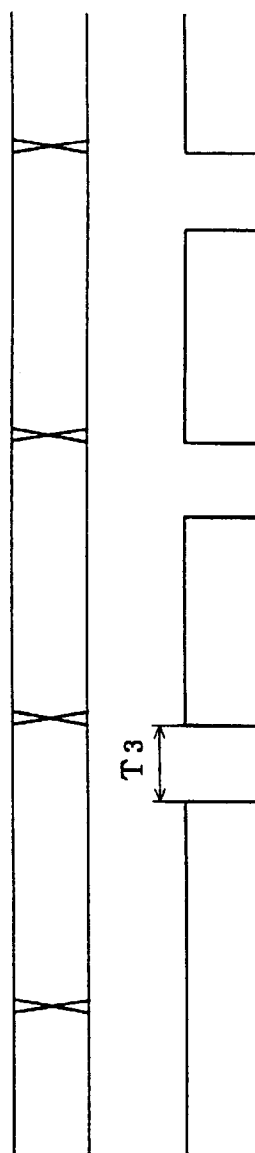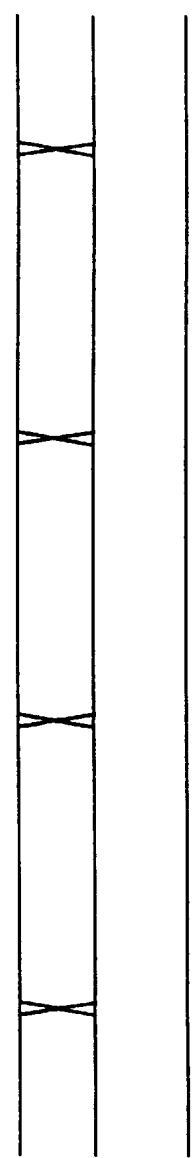
FIG. 6A OUTPUT FROM SELECTOR 2044 (SIGNAL CECW)
FIG. 6B OUTPUT FROM SELECTOR 2038 (ADDRESS JA)
FIG. 6C OUTPUT FROM SELECTOR 2045 (SIGNAL WECW)
FIG. 6D OUTPUT FROM GATE 2040 (MULTIPLICATION RESULT M)
FIG. 6E (OEC)a "H"
FIG. 6F $\overline{CLR1}$ "H"

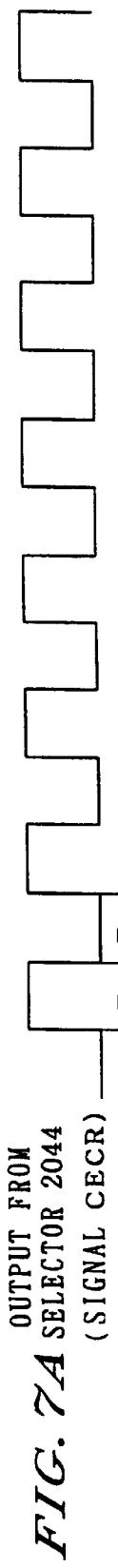
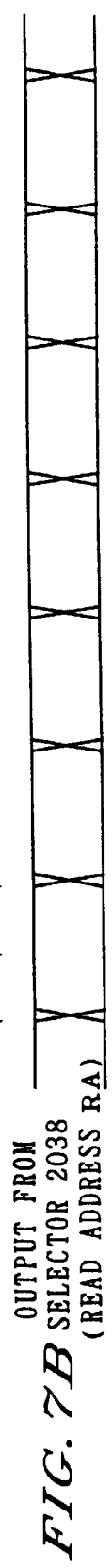
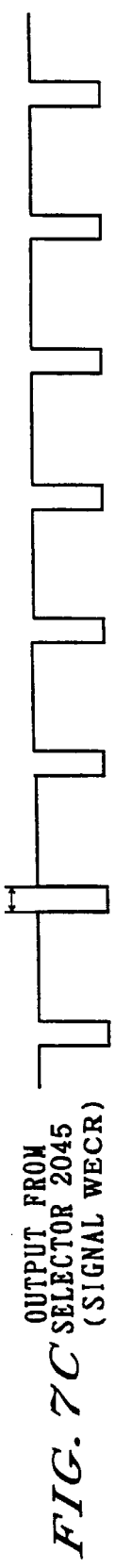
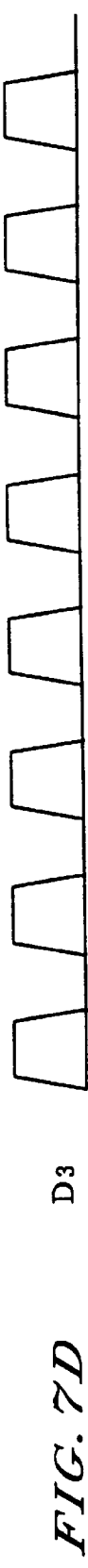
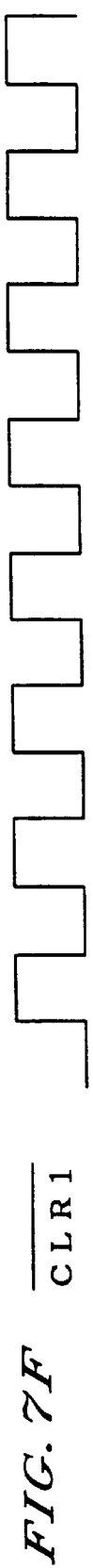
FIG. 7A  OUTPUT FROM SELECTOR 2044 (SIGNAL CECR)
FIG. 7B  OUTPUT FROM SELECTOR 2038 (READ ADDRESS RA)
FIG. 7C  OUTPUT FROM SELECTOR 2045 (SIGNAL WECR)
FIG. 7D  $D_3$
FIG. 7E  (OEC)a  "L"
FIG. 7F  $\overline{CLR1}$

DEVICE AND METHOD FOR PROCESSING RUN-LENGTH ENCODED SIGNALS BY USING AN ADDRESS GENERATOR

BACKGROUND OF THE INVENTION

1. Field of the Invention

The present invention relates to a signal processing device and, more particularly, to a technique for detecting the zero run length of codes and decoding to perform an inverse zigzag transform.

2. Description of the Background Art

FIG. 11 is a block diagram of the background art illustrating a decoder means 299 for decoding information, given in the form of Huffman codes, into image data.

The decoder means 299 comprises a Huffman decoding portion 201, an inverse quantization portion 202, an inverse zigzag transform portion 203, an inverse-discrete cosine transform portion (referred to as an "IDCT portion" hereinafter) 206, a Huffman code table 3, and a quantization table 4.

The Huffman decoding portion 201 receives a Huffman code HC and decodes the Huffman code HC in conjunction with the Huffman code table 3 to sequentially output a zero run length ZRL and a non-zero effective coefficient NZ. The inverse quantization portion 202 determines inversely quantized data IQ from the zero run length ZRL and the effective coefficient NZ in conjunction with the quantization table 4. The inverse zigzag transform portion 203 receives the inversely quantized data IQ and outputs a DCT coefficient $D_3$. The IDCT portion 206 receives and converts the DCT coefficient $D_3$ into restored image data $D_4$.

The inverse quantization portion 202 performs multiplication upon a quantization coefficient Qi given from the quantization table 4 to output the inversely quantized data IQ. Specifically, the inverse quantization portion 202 sequentially updates addresses of the quantization table 4 and multiplies the quantization coefficient Qi corresponding to an address by either the effective coefficient NZ or the value "0". Since no zero run length ZRL but only an effective coefficient NZ is first obtained from a block of Huffman codes, the quantization coefficient Qi corresponding to the first address is multiplied by the effective coefficient NZ. Thereafter, since a pair of zero run length ZRL and effective coefficient NZ are provided, the quantization coefficient Qi is multiplied by the value "0" as many times as the magnitude of the zero run length ZRL in succession, and then the quantization coefficient Qi is multiplied by the effective coefficient NZ.

The inverse zigzag transform portion 203 receives the inversely quantized data IQ and performs an inverse zigzag transform by arranging the inversely quantized data IQ in zigzag order and reading them in serial order, to output the DCT coefficient $D_3$.

In the conventional decoder means 299, the number of multiplications in the inverse quantization portion 202 is required to correspond to a block of Huffman codes. For instance, when an image data corresponding to one block of Huffman codes includes 8×8=64 pixels, the inverse quantization portion 202 is required to perform sixty-four multiplications in corresponding relation to the one block of Huffman codes.

Similarly, the inverse zigzag transform portion 203 is required to arrange sixty-four data in zigzag form in corresponding relation to the one block of Huffman codes.

This results in time-consuming arithmetic operations and delayed processing times.

SUMMARY OF THE INVENTION

The present invention is a signal processing device for processing an input signal including a plurality of first digits having a single first value and a plurality of second digits having at least one second value other than the first value. According to the invention, the device comprises: (a) an address generator including: (a-1) a first input for sequentially receiving a run length indicative of the number of contiguous first digits in the input signal; (a-2) a second input for sequentially receiving the second digits; (a-3) a first output for sequentially outputting a first address updated by a value of the run length plus one; and (a-4) a second output for sequentially outputting the second digits in synchronism with the first address, and (b) a signal processor for performing a predetermined signal processing upon the first address and the second digits to output an array of output signals.

The address generator produces the first address corresponding to the second value.

Preferably, the address generator further includes: (a-5) a "zero" detector having an input connected to the first input and an output for providing a detection signal; (a-6) a first selector having a first end connected to the first input, a second end constantly receiving the value "1", a control end receiving the detection signal, and an output for providing either data at the first end or data at the second end in response to the detection signal; and (a-7) an adder having a first end, a second end connected to the output of the first selector, a third end receiving the detection signal, and an output for providing the sum of data at the first to third ends to the first end thereof, and the detection signal is "0" when the run length is zero and the detection signal is "1" when the run length is not zero.

The first address is produced and sequentially updated through the different steps depending upon the zero/non-zero value of the run length.

The signal processing in the signal processor is performed for the second value rather than the first value, thereby omitting production of unnecessary addresses, thus allowing high speed processing.

Preferably, the signal processor includes: (b-1) multiplier storage means having multipliers stored therein in relation to respective addresses, the multiplier storage means receiving the first address for outputting one of the multipliers corresponding to the first address; and (b-2) multiplying portion receiving the second value for multiplying the second value by the one of the multipliers to output a multiplication result, the one of the multipliers which corresponds to the first address corresponding to the second value.

Since the multiplier corresponding to the first address is only multiplied by the second value, the number of multiplications is reduced, enabling high-speed signal processing.

Preferably, the signal processor further includes: (b-3) a memory having a predetermined storage area previously storing the first value therein, the memory receiving the first address and the multiplication result corresponding to the first address, and determining a second address specifying a portion of the predetermined storage area based on the first address on the basis of a predetermined rule, and updating the first value stored at the second address into the multiplication result corresponding to the first address to store the updated result.

The first value is previously applied to the memory, and the memory is written with desired data by rewriting the multiplication result at the second address corresponding to the first address, permitting high-speed signal processing.

Preferably, the memory includes: (b-3-1) first and second storage means previously storing the first value therein for updating the first value stored at the second address into a multiplication result corresponding to the first address and storing the multiplication result therein. The memory also includes (b-3-2) first and second selectors corresponding respectively to the first and second storage means, the first and second selectors selectively outputting the second address and a successively updating a read address to the first and second storage means, respectively, and writing into the first and second storage means on the basis of the second address. The first and second storage means are read on the basis of the read address being alternated by switching the first and second selectors, the reading from the first storage means being performed within a time period over which the writing into the second storage means is performed, and the reading from the second storage means being performed within a time period over which the writing into the first storage means is performed.

The provision of the pair of storage means enables the reading from one of the storage means during the time period over which the other storage means is written.

Preferably, the memory includes: (b-3-1) first and second storage means previously storing the first value therein for updating the first value stored at the second address into a multiplication result corresponding to the first address and storing the multiplication result therein. The memory also includes first and second selectors corresponding respectively to the first and second storage means, the first and second selectors selectively outputting the second address and a successively updating a read address to the first and second storage means, respectively, and writing into the first and second storage means on the basis of the second address. The first and second storage means are read on the basis of the read address being alternated by switching the first and second selectors, the writing into the first storage means being performed within a time period over which the reading from the second storage means is performed, and the writing into the second storage means being performed within a time period over which the reading from the first storage means is performed.

The provision of the pair of storage means enables the writing into one of the storage means during the time period over which the other storage means is read.

The writing is alternated between the pair of storage means to eliminate the need to separately set a read time and a write time, permitting rapid signal processing.

The present invention is also a method of processing an input signal including a plurality of first digits having a single first value and a plurality of second digits having at least one second value other than the first value. According to the invention, the method comprises the steps of: (a) sequentially inputting a run length indicative of the number of contiguous first digits in the input signal; (b) sequentially inputting the second digits; (c) updating a first address by a value of the run length plus one to sequentially output the updated first address; and (d) sequentially outputting the second digits in synchronism with the first address.

The first address corresponding to the second value is produced, but addresses corresponding to the first value are not produced, permitting high-speed processing.

Preferably, the method further comprises the steps of: (e) inputting the first address to a multiplier storage means storing multipliers corresponding to addresses so as to provide one of the multipliers corresponding to the first address; and (f) multiplying the second value by the one of the multipliers corresponding to the first address to provide a multiplication result.

The multiplier corresponding to the first address is only multiplied by the second value. This reduces the number of multiplications and permits rapid signal processing.

Preferably, the method further comprises the steps of: (g) inputting the first address and the multiplication result corresponding to the first address to a memory having a predetermined storage area which previously stored the first value therein; (h) determining, based on the first address and on the basis of a predetermined rule, a second address specifying a portion of the predetermined storage area; and (i) updating the first value stored at the second address into the multiplication result corresponding to the first address to store the updated result.

The first value is previously applied to the memory, and the memory is written with desired data by rewriting the multiplication result at the second address corresponding to the first address, permitting high-speed signal processing.

Preferably, the method further comprises the steps of: (j) updating the first value stored at the second address into the multiplication result corresponding to the first address to write the updated result into the first storage means previously storing the first value therein; (k) updating the first value stored at the second address into the multiplication result corresponding to the first address to write the updated result into second storage means previously storing the first value therein; (l) reading from the first storage means one of the first value stored in corresponding relation to a successively updated read address and the multiplication result to write the first value into the read address; and (m) reading from the second storage means one of the first value stored in corresponding relation to the successively updated read address and the multiplication result to write the first value into the read address, the step (m) being executed during a time period over which the step (j) is executed, the step (l) being executed during a time period over which the step (k) is executed.

The reading from one of the storage means is allowed during the time period over which the other storage means is written.

Preferably, the method further comprises the steps of: (j) updating the first value stored at the second address into the multiplication result corresponding to the first address to write the updated result into first storage means previously storing the first value therein; (k) updating the first value stored at the second address into the multiplication result corresponding to the first address to write the updated result into second storage means previously storing the first value therein; (l) reading from the first storage means one of the first value stored in corresponding relation to a successively updated read address and the multiplication result to write the first value into the read address; and (m) reading from the second storage means one of the first value stored in corresponding relation to the successively updated read address and the multiplication result to write the first value into the read address, the step (j) being executed during a time period over which the step (m) is executed, the step (k) being executed during a time period over which the step (l) is executed.

The writing into one of the storage means is allowed during the time period over which the other storage means is read.

The writing is alternated between the pair of storage means to eliminate the need to separately setting the read time and the write time, permitting rapid signal processing.

It is therefore an object of the present invention to perform signal processing, particularly decoding, at high speeds.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a timing chart illustrating operation in a first case of the third preferred embodiment;

FIGS. 6 and 7 are timing charts illustrating operation of the third preferred embodiment;

DESCRIPTION OF THE PREFERRED EMBODIMENTS

A. General Construction

Figure 1:
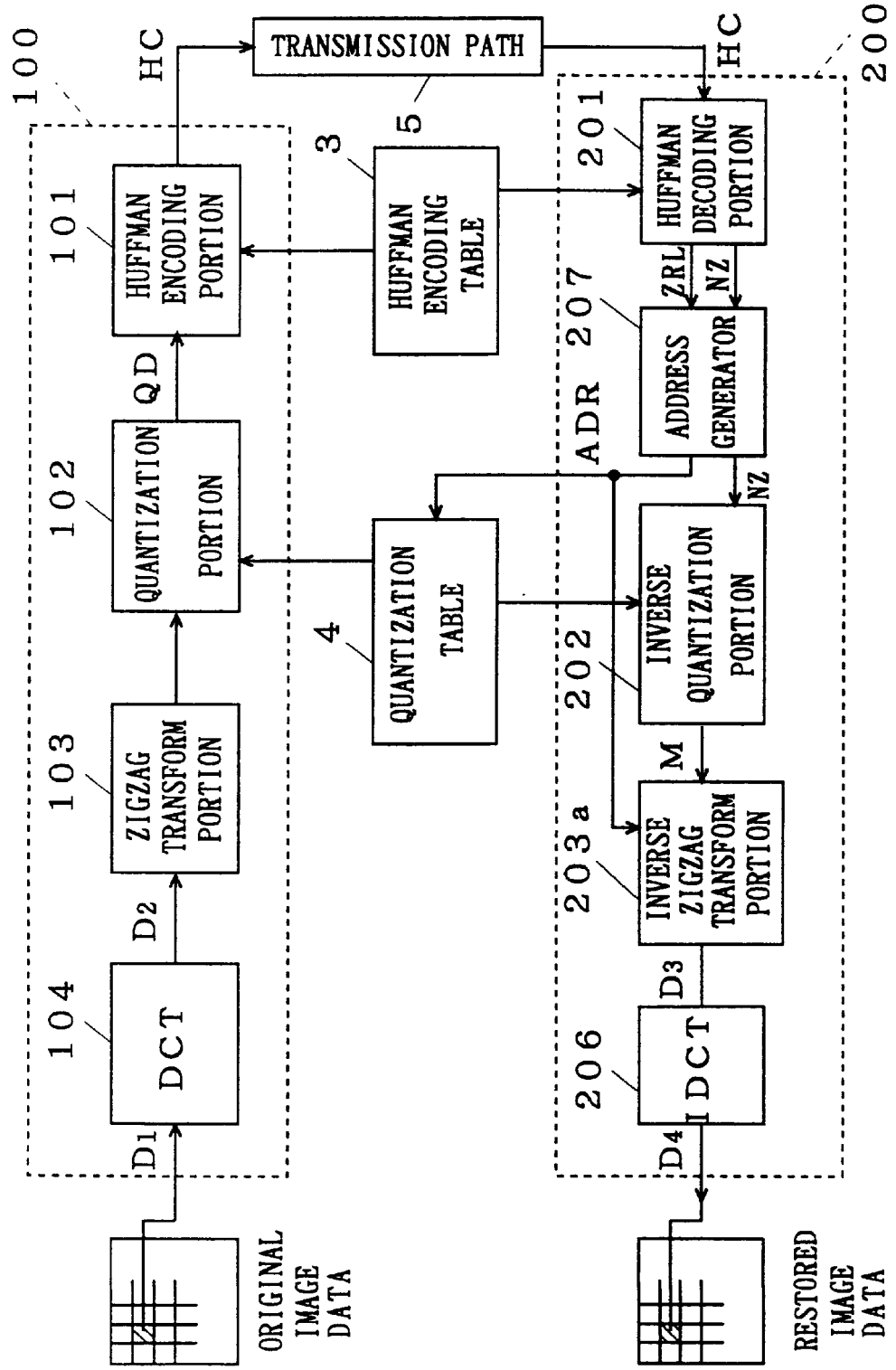
FIG. 1 is a block diagram of a decoder means 200 according to the present invention.

FIG. 1 is a block diagram of a decoder means 200 in relation with Huffman codes and illustrates image data transmission using the Huffman codes for image data compression.

Original image data to be transmitted is generated by sequentially extracting a part of an image consisting of a plurality of pixels. Description will be given herein on transmission of original image data $D_1$ having 8×8=64 pixels, for example.

An encoder means 100 converts the image data $D_1$ to a Huffman code HC which is then transmitted through a transmission path 5 to the decoder means 200. The decoder means 200 decodes the original Huffman code HC through process steps to be described later using a quantization table 4 and a Huffman code table 3 to output restored image data $D_4$ corresponding to the original image data $D_1$. The restored image data $D_4$ are sequentially synthesized to restore the image.

The encoder means 100 comprises a discrete cosine transform portion (referred to as a "DCT" hereinafter) 104, a zigzag transform portion 103, a quantization portion 102, and a Huffman encoding portion 101. The decoder means 200, similar to the decoder means 299 of the background art, comprises a Huffman decoding portion 201, an inverse quantization portion 202, an inverse zigzag transform portion 203a, an IDCT portion 206, and an address generator 207.

The respective components will be discussed below, for instance, when the original image data $D_1$ corresponds to a matrix expressed by Equation (1).

$$D_1 = \begin{bmatrix} 159 & 153 & 158 & 152 & 140 & 138 & 132 & 132 \\ 164 & 162 & 162 & 157 & 151 & 142 & 134 & 132 \\ 167 & 168 & 161 & 160 & 158 & 145 & 139 & 134 \\ 164 & 168 & 161 & 166 & 162 & 152 & 149 & 141 \\ 171 & 166 & 168 & 167 & 163 & 162 & 157 & 151 \\ 173 & 164 & 169 & 170 & 166 & 166 & 162 & 161 \\ 175 & 169 & 172 & 176 & 174 & 172 & 174 & 166 \\ 173 & 172 & 175 & 173 & 180 & 181 & 177 & 172 \end{bmatrix} \quad (1)$$

Equation (1) corresponds to luminous elements of 8×8=64 pixels, for example.

B. Operation of Encoder Means 100

The DCT portion 104 performs a discrete cosine transform on the original image data $D_1$ to produce a DCT coefficient $D_2$ expressed by Equation (2).

$$D_2 = \begin{bmatrix} 260 & 49 & -16 & 5 & 2 & 4 & 0 & 1 \\ -79 & 36 & -2 & -7 & 1 & -3 & -1 & -2 \\ 0 & -8 & 3 & -2 & -2 & 1 & 5 & 1 \\ -8 & -4 & 5 & -4 & 1 & 7 & 6 & -2 \\ -2 & -6 & -1 & 0 & -4 & -1 & 0 & -1 \\ -3 & -2 & -1 & -1 & 1 & 2 & -5 & -1 \\ -4 & -1 & 1 & 0 & 0 & -2 & 2 & 0 \\ 1 & 1 & 1 & 1 & -1 & 1 & 0 & 0 \end{bmatrix} \quad (2)$$

This transform allows information about the original image data $D_1$ to be expressed by a matrix wherein the absolute values of elements substantially decrease from the upper left corner toward the lower right corner as shown in Equation (2). The elements of the DCT coefficient $D_2$ are arranged in zigzag form by the zigzag transform portion 103. Specifically, the elements are picked up in order from the upper left corner toward the lower right corner: "260" in the first row, the first column; "49" in the first row, the second column; "–79" in the second row, the first column; "0" in the third row, the first column; "36" in the second row, the second column; "–16" in the first row, the third column; . . . Such a zigzag transform is disclosed, for example, in "A. Tescher and R. Cox, "An Adaptive Transform Coding Algorithm", IEEE International Conference on Communications, pp. 47.20–47.25, 1976".

The data obtained in this manner is quantized by the quantization portion 102 on the basis of the quantization table 4 into quantized data QD. Equation (3) represents the contents of the quantization table 4 in the form of a matrix Q having quantization coefficients Qi as elements. The table herein corresponds to a table for quantization of luminous elements. The quantization table has no default values but may be set freely. Thus, Equation (3) is an example.

$$Q = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix} \quad (3)$$

The quantization coefficients Qi are not in 8 by 8 form in practice as shown in Equation (3) because the data subjected to the zigzag transform is quantized. However, the quantization coefficients Qi are shown herein as aligned with the elements of the DCT coefficient $D_2$ before the zigzag transform for the purpose of convenience of expression.

The quantization data QD before the zigzag transform are arranged as shown in Equation (4).

$$QD = \begin{bmatrix} 16 & 4 & -2 & 0 & 0 & 0 & 0 & 0 \\ -7 & 3 & 0 & 0 & 0 & 0 & 0 & 0 \\ 0 & -1 & 0 & 0 & 0 & 0 & 0 & 0 \\ -1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \quad (4)$$

In practice, the quantization is performed after the zigzag transform, and the quantization data QD is expressed in the form of a train of numerals represented by $$QD = 16, 4, -7, 0, 3, -2, 0, 0, -1, -1, 0, \ldots, 0 \quad (5)$$

where there are 54 zeros arranged in succession at the end.

As above described, the quantization data QD has a multiplicity of zeros. Although the quantization data QD is converted into the Huffman codes, zeros are multiplied for inverse quantization by the decoder means, resulting in time-consuming processes. The present invention provides for time reduction by merely adopting a fixed value "0" in place of multiplication of zeros.

The Huffman encoding portion 101 produces the Huffman code HC from the quantization data QD by using the Huffman code table 3, and the Huffman code HC is transmitted on the transmission path 5. The Huffman code HC is expressed by Equation (6) in corresponding relation to the quantization data QD expressed by Equation (5).

$$HC = 101011010010010000011011110101110000001010 \quad (6)$$

C. Operation of Decoder Means 200

The decoder means 200 receives the Huffman code HC from the transmission path 5 and then applies the Huffman code HC to the Huffman decoding portion 201. Similar to the background art, the Huffman decoding portion 201 outputs a zero run length ZRL and a non-zero effective coefficient NZ. The address generator 207 receives the zero run length ZRL and the non-zero effective coefficient NZ to produce a write address ADR. The corresponding effective coefficient NZ is outputted from the address generator 207.

The write address ADR is impressed upon the quantization table 4 and the inverse zigzag transform portion 203a. The effective coefficient NZ is impressed upon the inverse quantization portion 202 which in turn inversely quantizes the effective coefficient NZ using the quantization table 4. The inversely quantized data is subjected to an inverse zigzag transform into the DCT coefficient $D_3$ as expressed by Equation (7).

$$D_3 = \begin{bmatrix} 256 & 44 & -20 & 0 & 0 & 0 & 0 & 0 \\ -84 & 36 & 0 & 0 & 0 & 0 & 0 & 0 \\ 0 & -13 & 0 & 0 & 0 & 0 & 0 & 0 \\ -14 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \quad (7)$$

The DCT coefficient $D_3$ corresponds to the DCT coefficient $D_2$ expressed by Equation (2). The IDCT portion 206 performs an inverse-discrete cosine transform to provide the restored image data $D_4$ expressed as Equation (8).

$$D_4 = \begin{bmatrix} 153 & 153 & 152 & 149 & 144 & 137 & 131 & 126 \\ 158 & 158 & 157 & 154 & 149 & 142 & 135 & 131 \\ 165 & 164 & 163 & 160 & 155 & 148 & 141 & 137 \\ 167 & 167 & 167 & 164 & 159 & 153 & 147 & 143 \\ 167 & 168 & 168 & 167 & 163 & 158 & 153 & 149 \\ 166 & 168 & 169 & 170 & 168 & 165 & 161 & 159 \\ 168 & 170 & 173 & 175 & 175 & 174 & 171 & 170 \\ 169 & 172 & 176 & 179 & 181 & 180 & 179 & 177 \end{bmatrix} \quad (8)$$

The restored image data which is subjected to the process of quantization does not necessarily coincide completely with the original image data $D_1$.

The present invention has two core techniques:

(First Technique) The multiplication in the inverse quantization portion 202 is limited to the multiplication of the effective coefficient NZ by the corresponding quantization cooefficient Qi.

(Second Technique) For inverse zigzag transform, the fixed values "0" are previously arranged so that the number of fixed values "0" corresponds to a block of Huffman codes and so that the effective coefficients NZ are subsequently overwritten in corresponding positions rather than arranging the data including the fixed value "0" and the effective coefficient NZ.

(C-1) First Preferred Embodiment

Figure 2:
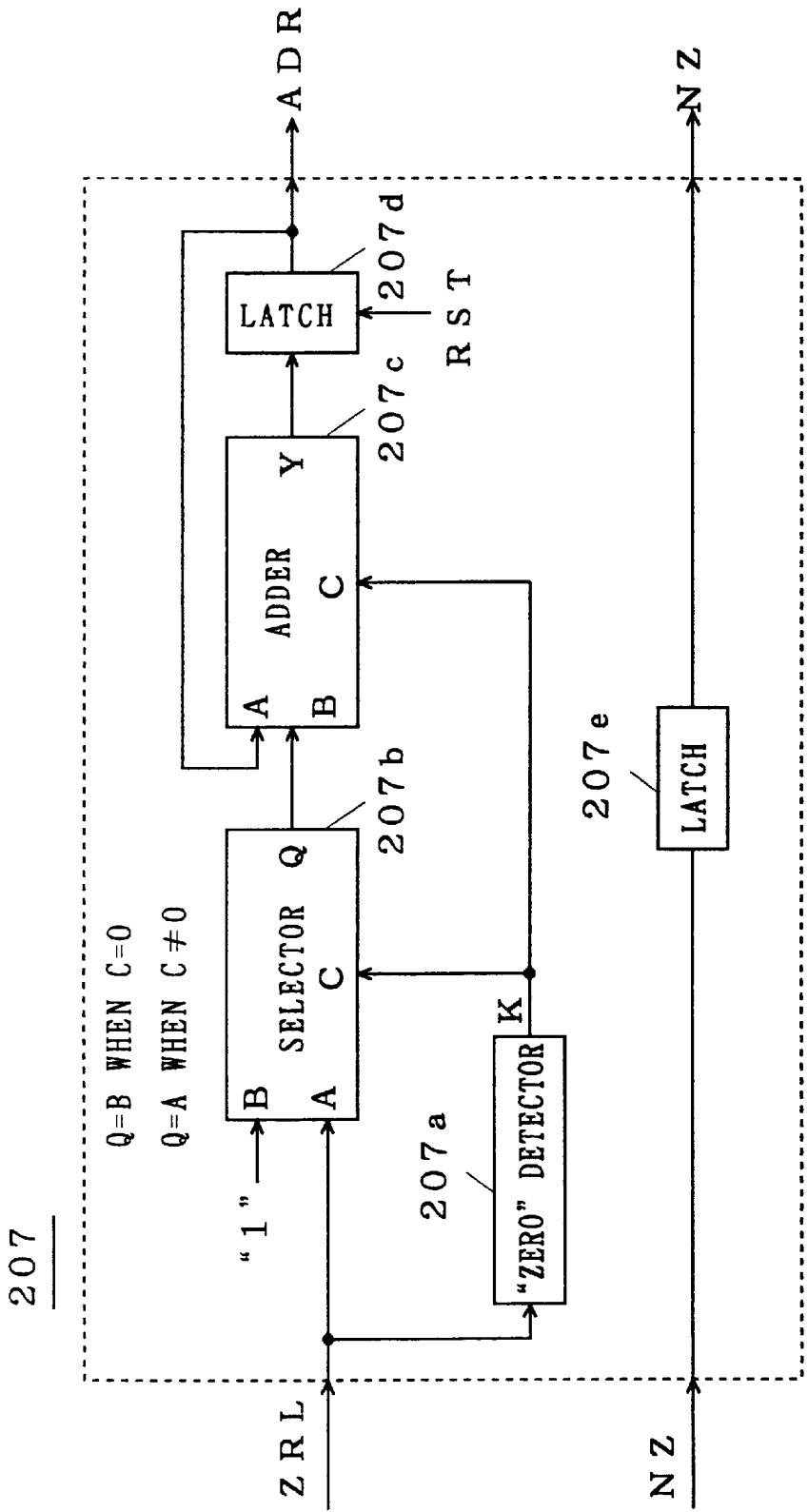
FIG. 2 is a block diagram of a first preferred embodiment of the present invention.

A first preferred embodiment of the present invention relates to the first technique. FIG. 2 is a block diagram of the address generator 207. The address generator 207 includes a "zero" detector 207a, a selector 207b, an adder 207c, a latch 207d, and a latch 207e.

The zero run length ZRL entering the address generator 207 is applied to an A input of the selector 207b. The fixed value "1" is constantly applied to a B input of the selector 207b.

The "zero" detector 207a outputs a detection signal K depending upon the value of the zero run length ZRL. The detection signal K is applied to a control terminal (C input) of the selector 207b and a C input of the adder 207c. The detection signal K is "0" when the zero run length ZRL is zero, and the detection signal K is "1" when the zero run length ZRL is not zero.

Depending upon the value of the detection signal K, the selector 207b selects i) the B input (the fixed value "1") when K=0 (the value of the zero run length ZRL is zero), and ii) the A input (the value of the zero run length ZRL) when K=1 (the value of the zero run length ZRL is not zero) and provides the selected input to its Q output.

The adder 207c has an A input, a B input, a C input, and a Y output. The sum of the A input, B input and C input is provided at the Y output. The B input of the adder 207c is connected to a Q output of the selector 207b.

The latch 207d receives the Y output of the adder 207c, holds it for a given time period, and outputs it. The output from the latch 207d is applied to the A input of the adder 207c. A reset signal RST is also applied to the latch 207d, and the Y output is reset in response to the activation of the reset signal RST. The latch 207e holds the effective coefficient NZ for a given time period and outputs it.

Transmission of a block of Huffman codes permits the reset signal RST to be activated. Although the construction for forming 8 by 8 pixels into a block is not particularly shown in FIGS. 1 and 2, such a technique is well known in the art and the reset signal RST is readily obtained in synchronism with a block of Huffman codes.

The Huffman decoding portion 201 changes the Huffman code represented by Equation (6) into a pair of zero run length ZRL and effective coefficient NZ expressed as Equation (9).

$$(ZRL, NZ) = (-,16), (0,4), (0,-7), (1,3), (0,-2), (2,-1), (0,-1), (54,-) \quad (9)$$

The first obtained pair has no element corresponding to the zero run length ZRL and is not a pair exactly. This results from the fact that the discrete-cosine transform performed on image data provides a non-zero element (DC component) in the first row, the first column in most cases. The last obtained pair has no element corresponding to the effective coefficient NZ and is not a pair exactly. This results from the fact that the quantization data QD expressed by Equation (5) ends with successive zeros. In some cases, the quantization data ends with an effective coefficient. In response to the quantization data QD expressed by Equation (5), such that eight pairs are formed into a block and applied to the address generator 207.

The activation of the reset signal RST causes the output from the latch 207d to become "0", and the output is provided as the write address ADR. The A input of the adder 207c also becomes "0". In synchronism with the write address ADR, the latch 207e outputs the effective coefficient NZ after a predetermined time delay.

When the first pair (−, 16) of zero run length ZRL and effective coefficient NZ is applied to the address generator 207, the write address ADR of "0" and the effective coefficient NZ (=16) are outputted in synchronism with each other.

Upon receipt of a second pair (0, 4) of zero run length ZRL and effective coefficient NZ, the address generator 207 updates the write address ADR and effective coefficient NZ. The "zero" detector 207a detects the zero run length ZRL being "0" and, accordingly, the detection signal K becomes "0". Thus, the selector 207b outputs the B input (the fixed value "1") at the Q output. The adder 207c receives the output of the selector 207b at its B input and adds it to the A and C inputs, with the write address ADR at the A input being "0" and the detection signal K at the C input being "0". Thus, the value "1" is provided at the Y output of the adder 207c. This allows the write address ADR of "1" and the effective coefficient NZ (=4) to be outputted in synchronism with each other.

Likewise, on receipt of the next pair (0, −7) of zero run length ZRL and effective coefficient NZ, the address generator 207 updates the write address ADR and the effective coefficient NZ to "2" and "−7", respectively. The write address ADR is sequentially updated one by one inasmuch as the zero run length ZRL is "0".

The write address ADR is updated non-successively when the zero run length ZRL is not zero, e.g. in the next pair (1, 3) of zero run length ZRL and effective coefficient NZ.

In this case, the detection signal K is "1" and the C input of the adder 207c is "1". Then the write address ADR is updated by adding together the value "2" of the write address ADR before updating at the A input, the value "1" of the zero run length ZRL at the B input, and the value "1" of the detection signal K at the C input, and the updated write address ADR is "4" corresponding to the effective coefficient NZ of "3".

In this manner, the address generator 207 does not generate the write address ADR corresponding to an ineffective coefficient having a zero value but generates the write address ADR corresponding to the effective coefficient NZ.

Pairs of write addresses ADR and effective coefficients NZ in synchronism with each other are expressed as:

$$(ADR\ NZ) = (0,16), (1,4), (2,-7), (4,3), (5,-2), (8,-1), (9,-1) \quad (10)$$

Since the last pair (54, −) of zero run length ZRL and effective coefficient NZ do not substantially have the effective coefficient NZ, there are provided no corresponding pair of write address ADR and effective coefficient NZ.

Unlike the background art, the inverse quantization portion 202 does not receive the zero run length ZRL but the effective coefficient NZ. The quantization table 4 applies to the inverse quantization portion 202 the quantization coefficient Qi corresponding to an address specified by the write address ADR. That is, the effective coefficient NZ and the corresponding quantization coefficient Qi are sequentially applied to the inverse quantization portion 202. With reference to Equations (5) and (10), pairs of effective coefficients NZ and quantization coefficients Qi to be applied to the inverse quantization portion 202 in synchronism with each other are expressed by Equation (11).

$$(NZ, Qi) = (16,16), (4,11), (-7,12), (3,12), (-2,10), (-1,13), (-1,14) \quad (11)$$

The inverse quantization portion 202 multiplies the effective coefficient NZ by the quantization coefficient Qi to provide a multiplication result M. The number of multiplications is required to equal the number of effective coefficients NZ (seven in the example of Equations (1) to (10)). The multiplications previously found to result in "0" which have been performed upon ineffective coefficients as well as effective coefficients in the background art (64 times in the example of Equations (1) to (10)) are not performed and, accordingly, the number of arithmetic operations are significantly reduced in number in the first preferred embodiment.

Pairs of write addresses ADR and multiplication results M are expressed as:

$$(ADR, M) = (0,256), (1,44), (2,-84), (4,36), (5,-20), (8,-13), (9,-14) \quad (12)$$

Suitable "0" input in the inverse zigzag transform portion 203a provides the restored image data $D_4$ similar to those of the background art. Therefore, decoding is carried out at high speeds.

The write addresses ADR required for calculation of the multiplication results M should be generated, but the write addresses ADR need not be generated for ineffective coefficients, thus allowing high-speed processing.

(C-2) Second Preferred Embodiment

Figure 3:
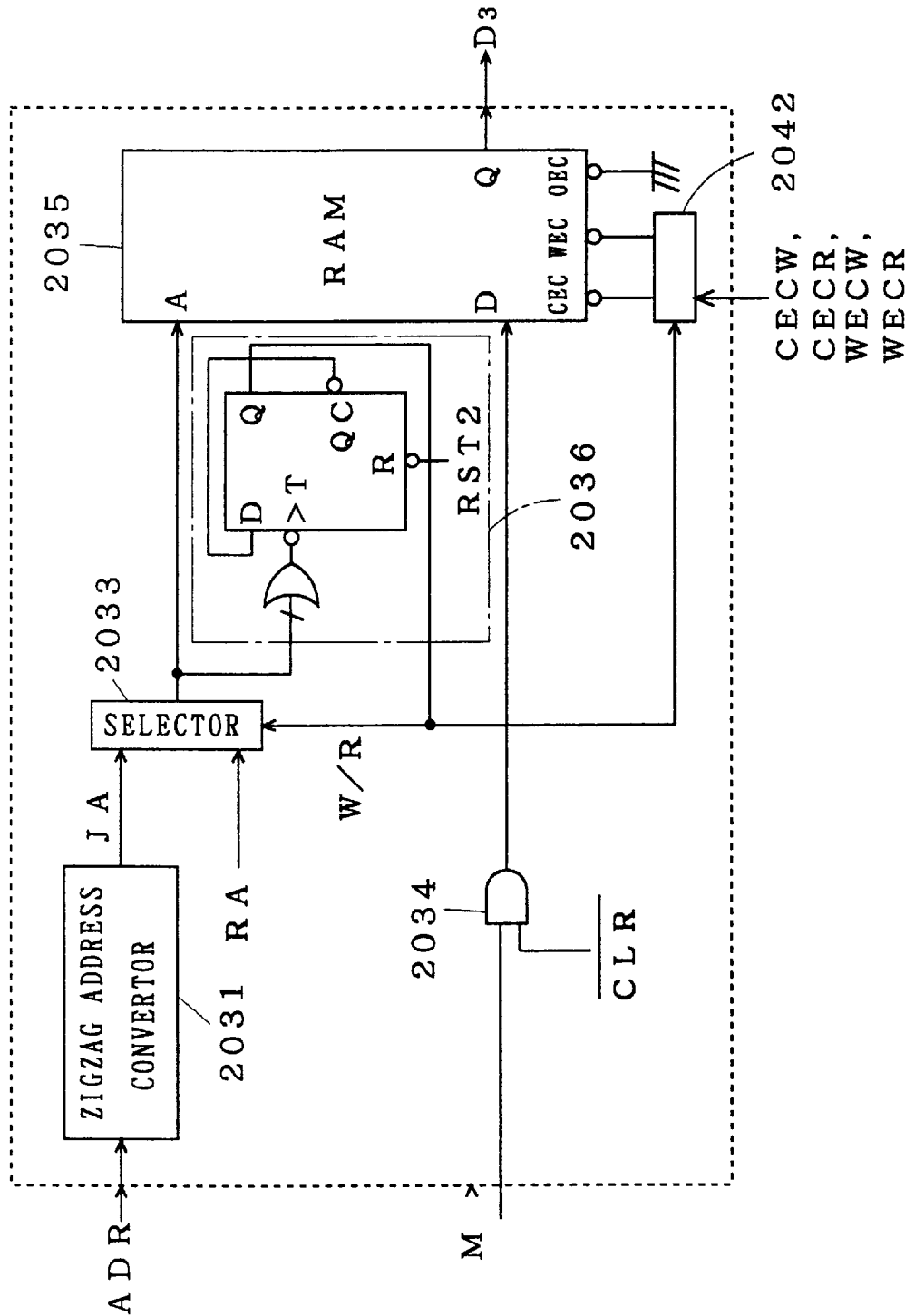
FIG. 3 is a block diagram of a second preferred embodiment of the present invention.

A second preferred embodiment of the present invention relates to the second technique. FIG. 3 is a block diagram of the inverse zigzag transform portion 203a. The background art inverse zigzag transform portion 203 arranges inversely quantized data IQ including "0" sequentially in zigzag order and serially reads the data. The inverse zigzag transform portion 203a of the second preferred embodiment previously arranges zeros in all regions associated with the zigzag transform and then arranges the inversely quantized data IQ including non-zero values in association with predetermined addresses.

The inverse zigzag transform portion 203a includes a zigzag address converter 2031, selectors 2033 and 2042, an AND gate 2034, a RAM 2035, and a full/empty detector 2036.

The zigzag address converter 2031 receives and zigzag converts the write address ADR into an address JA which is in turn transmitted to a first input of the selector 2033. A second input of the selector 2033 receives a read address RA. The selector 2033 selectively outputs these inputs in response to a read/write signal W/R to an A input or address input of the RAM 2035. The read/write signal W/R is generated by the full/empty detector 2036 using the output from the selector 2033.

The multiplication result M is transmitted to a first input of the AND gate 2034. A clear signal $\overline{CLR}$ is applied to a second input of the AND gate 2034. The output from the AND gate 2034 is applied to a D input or data input of the RAM 2035. The RAM 2035 has a capacity corresponding to at least a block of Huffman codes and includes an output enable signal OEC, a chip enable terminal CEC, and a write enable terminal WEC. The chip enable terminal CEC and the write enable terminal WEC are connected to the selector 2042.

As will be described later, the RAM 2035 is previously written with "0" or empty at all addresses required for zigzag transform by read-modify-write. Then the full/empty detector 2036 sets a write mode by means of the read/write signal W/R. The selector 2033 accordingly applies the output from the zigzag address converter 2031 or the address JA to the A input or address input of the RAM 2035. The selector 2042 applies signals CECW, WECW which enable writing into the RAM 2035 to the chip enable terminal CEC and the write enable terminal WEC, respectively. In response thereto, the gate 2034 applies the multiplication result M to the D input or data input of the RAM 2035.

Having been written with "0" at all addresses required for zigzag transform by the read-modify-write, the RAM 2035 is written with the multiplication result M at the address JA corresponding to the effective coefficient NZ. No other addresses need to be written because the ineffective coefficient "0" was previously written at addresses other than the address JA.

Hence, data corresponding to the number of all pixels are written by performing write operations as many times as the number of addresses JA corresponding to the effective coefficient NZ. In the case represented by Equations (1) to (12), 8×8=64 write operations are not needed but seven write operations are sufficient.

The addresses JA are monitored from the output of the selector 2033, and when a full state of the RAM 2035 is detected, the full/empty detector 2036 sets a read mode by means of the read/write signal W/R. Then the selector 2033 selects the read address RA and applies it to the A input of the RAM 2035. The selector 2042 applies signals CECR, WECR which enable reading from the RAM 2035 to the chip enable terminal CEC and the write enable terminal WEC, respectively.

The multiplication result M and zeros arranged in zigzag order are read by the serially applied read addresses RA. Thus, the RAM 2035 outputs at its Q output the DCT coefficient $D_3$ having elements arranged by the inverse zigzag transform.

During such read operations, "zero" is subsequently applied at the addresses which have been read by the read-modify-write. This "zero" is based on the clear signal $\overline{CLR}$ given through the gate 2034. The RAM 2035 has been full in the write mode and, hence, no longer receives the multiplication result M at its D input. The RAM 2035 becomes empty again by the read-modify-write which uses "zero" as rewrite data, and the full/empty detector 2036 sets the write mode by means of the read/write signal W/R. Subsequently, the multiplication result M corresponding to the next block of Huffman codes and the write address ADR are applied to the inverse zigzag transform portion 203a.

Specifically, the full/empty detector 2036 detects the full state of the RAM 2035 in the following manner: It will be understood from Equation (12) that a first value of a block of write addresses ADR corresponding to a block of Huffman codes is constantly "0", and the same is true for the addresses JA given by the zigzag address conversion. In the write mode, when the sequentially changing output of the selector 2033 becomes "0", it means the appearance of the first address of a group of write addresses ADR corresponding to the next block of Huffman codes.

Then a D flip-flop of the full/empty detector 2036 is triggered to invert the read/write signal W/R through an OR gate receiving a plurality of bit lines (e.g., 6 bit lines when 8 by 8 pixels form a block). Thus the read mode is set when the RAM 2035 is full.

The read address RA generates values 00 to 3F (when 8 by 8 pixels form a block) in cycles. When the sequentially changing output value of the selector 2033 becomes "0", it means that all contents of the RAM 2035 have been read. Then the D flip-flop of the full/empty detector 2036 is triggered to invert the read/write signal W/R. Thus the write mode is set when the RAM 2035 is empty. A reset signal RST2 is applied to the D flip-flop to initialize the full/empty detector 2036 when all operations are in an initial state.

In this manner, the inverse zigzag transform reduces the number of write operations into the RAM 2035 and shortens the processing time. High-speed operation of the inverse quantization portion 202 discussed in the first preferred embodiment and high-speed operation of the inverse zigzag transform portion 203a discussed in the second preferred embodiment provides for operation of the decoder means 200 of FIG. 1 at much higher speeds.

(C-3) Third Preferred Embodiment

Although processing of a block of Huffman codes is sped up in the second preferred embodiment, high speed processing may be accomplished when a plurality of blocks of Huffman codes are applied in succession. More rapid processing is permitted by two RAMs, one of the RAMs writing to an address corresponding the next Huffman code while the other RAM is reading written data.

(C-3-1) Overview of Construction

Figure 4:
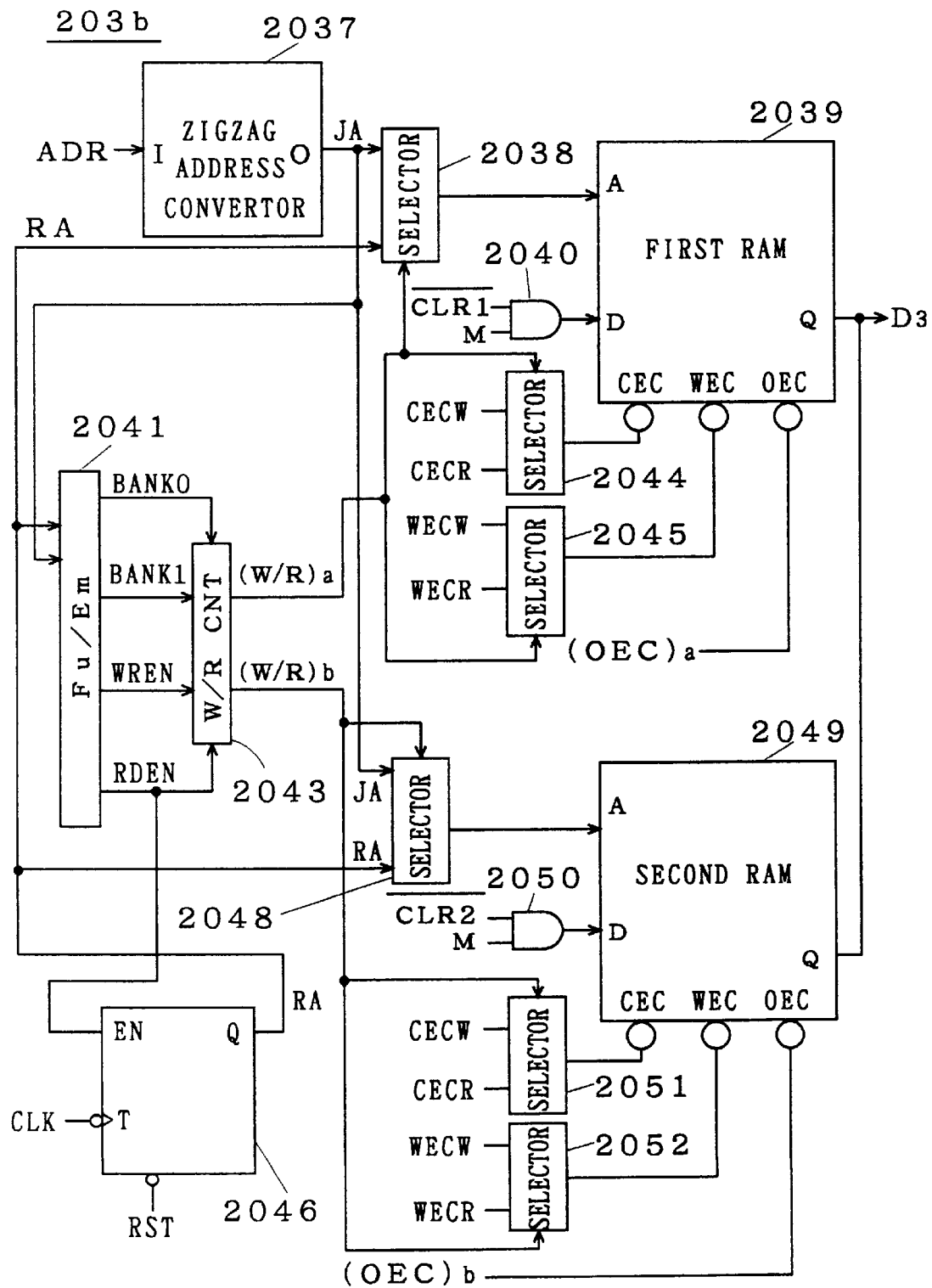
FIG. 4 is a block diagram of a third preferred embodiment of the present invention.

FIG. 4 is a block diagram of an inverse zigzag transform portion 203b according to a third preferred embodiment of the present invention. High speed operation of the decoder means 200 is achieved by substituting the inverse zigzag transform portion 203b for the inverse zigzag transform portion 203a of FIG. 1.

The inverse zigzag transform portion 203b includes a pair of first and second RAMs 2039, 2049. Similar to the RAM 2035 of the second preferred embodiment, the RAMs 2039, 2049 has a capacity corresponding to at least a block of Huffman codes. Each of the first and second RAMs 2039, 2049 has a chip enable terminal CEC, a write enable terminal WEC, and output enable terminal OEC. Signals $(OEC)_a$ and $(OEC)_b$ are applied to the output enable terminals OEC of the first and second RAMs 2039 and 2049, respectively.

The first and second RAMs 2039, 2049 may be SRAMs or be replaced with DRAMs by means of a well know technique.

Selectors 2038, 2044, 2045 and an AND gate 2040 are provided corresponding to the first RAM 2039. Selectors 2048, 2051, 2052 and an AND gate 2050 are provided corresponding to the second RAM 2049.

The inverse zigzag transform portion 203b further includes a zigzag address converter 2037, a full/empty detector 2041, a read/write controller 2043, and a read address generator 2046. The full/empty detector 2041 produces a write permission signal WREN, a read permission signal RDEN, and selection signals BANK0 and BANK1 from the address JA and read address RA. The read/write controller 2043 produces a first read/write signal (W/R)$_a$ and a second read/write signal (W/R)$_b$ from the four signals WREN, RDEN, BANK0, BANK1. The read address generator 2046 includes a counter (6 digits when 8 by 8 pixels form a block) for producing the read address RA from a clock signal CLK. The read address generator 2046 receives the read permission signal RDEN at its enable terminal, and produces the read address RA only when the read permission signal RDEN is "1".

The zigzag address converter 2037 receives and zigzag converts the write address ADR to produce the address JA. The address JA is applied to a first input of the selector 2038, and the read address RA is applied to a second input thereof. Relation between the zigzag address converter 2037 and the selector 2038 in the inverse zigzag transform portion 203b is similar to relation between the zigzag address converter 2031 and the selector 2033 in the inverse zigzag transform portion 203a. Likewise, relation between the zigzag address converter 2037 and the selector 2048 in the inverse zigzag transform portion 203b is similar to relation between the zigzag address converter 2031 and the selector 2033 in the inverse zigzag transform portion 203a.

The selector 2038 selectively outputs the address JA and the read address RA to an A input of the RAM 2039 in response to the first read/write signal (W/R)$_a$. Similarly, the selector 2048 selectively outputs the address JA and the read address RA to an A input of the RAM 2049 in response to the second read/write signal (W/R)$_b$.

The first read/write signal (W/R)$_a$ is also applied to the selectors 2044 and 2045, and the second read/write signal (W/R)$_b$ is also applied to the selectors 2051 and 2052.

The first and second read/write signals (W/R)$_a$ and (W/R)$_b$ are produced by the full/empty detector 2041 and the read/write controller 2043 using the address JA and the address RA. The procedure of the production of these signals (W/R)$_a$ and (W/R)$_b$ will be detailed later.

The multiplication result M is transmitted to respective first inputs of the AND gates 2040 and 2050. First and second clear signals $\overline{\text{CLR1}}$ and $\overline{\text{CLR2}}$ are applied to second inputs of the AND gates 2040 and 2050, respectively. Outputs from the AND gates 2040 and 2050 are applied to D inputs of the first and second RAMs 2039 and 2049, respectively. Relation between the AND gate 2040 and the first RAM 2039 and relation between the AND gate 2050 and the second RAM 2049 are similar to relation between the AND gate 2034 and the RAM 2035 in the inverse zigzag transform portion 203a except that the clear signals $\overline{\text{CLR1}}$ and $\overline{\text{CLR2}}$ are not identical with each other. The detailed active/inactive state of the clear signals $\overline{\text{CLR1}}$ and $\overline{\text{CLR2}}$ will be discussed later.

(C-3-2) Operation

As described in the second preferred embodiment, the write operations which are not performed at the addresses corresponding to the ineffective coefficient are rapidly carried out according to the present invention. When two RAMs simultaneously perform write and read operations, respectively, for high speed processing, one of the RAMs must wait for the processing of the other RAM in some cases. Description will be given hereinafter on operation of the inverse zigzag transform portion 203b in two cases.

(C-3-2-1) First Case wherein Reading from RAM Is Faster Than Writing into RAM

FIG. 5 is a timing chart showing the operation of the inverse zigzag transform portion 203b. Since reading from a RAM is faster than writing into the RAM, the speed of operation of the inverse zigzag transform portion 203b is determined by the write operation. Thus, the write permission signal WREN is constantly "1" indicating that writing is enabled.

Initially before a time $t_1$, the multiplication result M is written into the first RAM 2039 in accordance with the address JA, and the second RAM 2049 having received no data is on standby. The time period over which the first RAM 2039 is written and the second RAM 2049 is on standby is represented as a time period $T_A$.

During the time period $T_A$, the first read/write signal (W/R)$_a$ is "1" and the first RAM 2039 is in a write mode. Specifically, the selector 2044 receiving two signals CECW and CECR selectively outputs the signal CECW in response to the first read/write signal (W/R)$_a$, and the selector 2045 receiving two signals WECW and WECR selectively outputs the signal WECW. The selector 2038 selectively applies the address JA to the A input of the first RAM 2039.

FIG. 6 is a timing chart showing the operation of the first RAM 2039 in the write mode. In the write mode, the output from the selector 2044 is the same as the signal CECW, the output from the selector 2045 is the same as the signal WECW, and the output from the selector 2038 is the same as the address JA.

In the write mode, the signal (OEC)$_a$ applied to the output enable terminal OEC of the first RAM 2039 is constantly inactive (logic "H"), and the first RAM 2039 is not permitted to output its storage contents to the Q output thereof.

The signal CECW is inactive (logic "H") during the early half (time period $T_1$) of a time period over which the address JA and the multiplication result M in synchronism therewith are not changed, and is active (logic "L") during the late half (time period $T_2$) thereof. The signal WECW is active (logic "L") during the late half (time period $T_3$) of the time period $T_2$. The first clear signal $\overline{\text{CLR1}}$ is constantly inactive (logic "H"), and the multiplication result M is applied to the D input of the first RAM 2039 through the gate 2040.

Thus, the address JA and the multiplication result M corresponding thereto are written into the RAM 2039 during the time period $T_3$.

When the first RAM 2039 written with all required data becomes full at the time $t_1$, the first RAM 2039 is required to output its contents as the DCT coefficient $D_3$ in accordance with the read address RA. The first address "0" of a group of addresses JA corresponding to the next block of Huffman codes is applied to the full/empty detector 2041. In response thereto, the selection signal BANK0 changes from "0" to "1". Consequently, the full/empty detector 2041 changes the read permission signal RDEN from "0" to "1". The first read/write signal (W/R)$_a$ changes to "0", and the first RAM 2039 enters the read mode.

Specifically, the selector 2044 receiving two signals CECW and CECR selectively outputs the signal CECR in response to the first read/write signal (W/R)$_a$, and the selector 2045 receiving two signals WECW and WECR selectively outputs the signal WECR. The selector 2038 selects and applies the read address RA to the A input of the RAM 2039.

FIG. 7 is a timing chart showing the operation of the first RAM 2039 in the read mode. In the read mode, the output from the selector 2044 is the same as the signal CECR, the output from the selector 2045 is the same as the signal WECR, and the output from the selector 2038 is the same as the read address RA.

In the read mode, the signal $(OEC)_a$ applied to the output enable terminal OEC of the first RAM 2039 is constantly active (logic "L"), and the first RAM 2039 is permitted to output its storage contents to the Q output thereof.

The signal CECR is inactive (logic "H") during the early half (time period $T_4$) of a time period over which the read address RA is not changed, and is active (logic "L") during the late half (time period $T_5$) thereof. The signal WECR is active (logic "L") during the late half (time period $T_6$) of the time period $T_5$. The first clear signal $\overline{CLR1}$ makes the same change as the signal CECR.

After an elapse of the time period $T_4$ since change in the read address RA, the signal CECR becomes active, which causes the corresponding data to be read to the Q output, and the DCT coefficient $D_3$ is outputted during the time period $T_5$. During the time period $T_6$, the first clear signal $\overline{CLR1}$ is newly written at the read address RA at this point of time. Since the first clear signal $\overline{CLR1}$ is "0" during the time period $T_5$ including the time period $T_6$, the data written into the read address RA is "0".

Repeating the above-mentioned operation provides the DCT coefficient $D_3$ having elements arranged by the inverse zigzag transform and permits the RAM 2039 to obtain "0" contents corresponding to a block of Huffman codes.

Referring again to FIG. 5, description will be given on the above-mentioned operation, that is, the operation of the first RAM 2039 in the read mode and the second RAM 2049 in the write mode. In response to the selection signal BANK0 being "1", the object to be written with a pair of address JA and multiplication result M is changed from the first RAM 2039 to the second RAM 2049. As above stated, the speed of operation of the inverse zigzag transform portion 203b is determined by the write operation herein, and the write permission signal WREN is constantly "1" indicating that writing is enabled. Thus, when the selection signal BANK0 becomes "1" at the time $t_1$, the second RAM 2049 is immediately written with the address JA and the corresponding multiplication result M. That is, the read/write controller 2043 changes the second read/write signal $(W/R)_b$ to "1" at the time $t_1$, and the second RAM 2049 enters the write mode.

Specifically, the selector 2051 receiving the two signals CECW and CECR selectively outputs the signal CECW in response to the second read/write signal $(W/R)_b$, and the selector 2052 receiving the two signals WECW and WECR selectively outputs the signal WECW.

The selector 2048 selects and applies the address JA to the A input of the RAM 2049. Thus the multiplication result M is written into the second RAM 2049 in accordance with the address JA.

Description is given on the length of the time periods of the above-mentioned operation, that is, the length of the time periods of the operation of the first RAM 2039 in the read mode and the second RAM 2049 in the write mode. These operations start simultaneously at the time $t_1$. The read-mode operation is performed independent of the input timing of the multiplication result M and the write address ADR and, accordingly, is sometimes faster than the write-mode operation. In FIG. 5, the read-mode operation of the first RAM 2039 is shown as ended at a time $t_2$, and the write-mode operation of the second RAM 2049 is shown as ended thereafter at a time $t_3$. It is assumed that the time period $T_B$ starts at the time $t_1$ and ends at the time $t_2$ and the time period $T_C$ starts at the time $t_2$ and ends at the time $t_3$. During the time period $T_B$, the first RAM 2039 is read while the second RAM 2049 is written. During the time period $T_C$, the second RAM 2049 is written while the first RAM 2039 is on standby.

The write operation of the second RAM 2049 during the time periods $T_B$ and $T_C$ is similar to that of the first RAM 2039. By replacing the selectors 2044, 2038, 2045, the gate 2040, the signal $(OEC)_a$, and the first clear signal $\overline{CLR1}$ in FIG. 6 with the selectors 2051, 2048, 2052, the gate 2050, the signal $(OEC)_b$, and the second clear signal $\overline{CLR2}$, respectively, there is shown in FIG. 6 the write operation of the second RAM 2049.

When reading of all contents of the first RAM 2039 is finished at the time $t_2$ after an elapse of the time period $T_B$, that is, when the first RAM 2039 becomes empty, the full/empty detector 2041 changes the selection signal BANK1 from "0" to "1" and changes the read permission signal RDEN from "1" to "0". This is done in response to the read address RA becoming "0". Then the time period $T_C$ starts.

The first RAM 2039 enters the standby state in response to change in the read permission signal RDEN. Specifically, the read permission signal RDEN becomes "0" and production of the read address RA is interrupted in the read address generator 2046. Accordingly, the first RAM 2039 the read operation of which is interrupted is on standby although being in the read mode.

The second RAM 2049 is in the write mode during the time period $T_C$ and continues the write operation. As far as the second RAM 2049 continues the write operation, the first RAM 2039 is on standby. Therefore, both of the first and second RAMs 2039 and 2049 are not written at the same address JA.

The write operation of the second RAM 2049 is completely ended at the time $t_3$. At this time, the first address "0" of a group of addresses JA corresponding to the next block of Huffman codes is impressed upon the full/empty detector 2041. In response thereto, the selection signal BANK0 changes from "1" to "0". Consequently, the first read/write signal $(W/R)_a$ changes from "0" to "1" and the first RAM 2039 enters the write mode. The second read/write signal $(W/R)_b$ changes from "0" to "1" and the second RAM 2049 enters the read mode.

The read mode of the first RAM 2039 is executed over a time period (from $t_1$ to $t_2$) shorter than the time period (from $t_1$ to $t_3$) over which the second RAM 2049 is in the write mode. After the time $t_3$, operation is interchanged between the first RAM 2039 and the second RAM 2049. Therefore, the speed of operation in the inverse zigzag transform portion 203b is determined by the time period required for the write mode.

Operation after the time $t_3$ is detailed below. During a time period $T_D$ (from $t_3$ to $t_4$), since the write permission signal WREN is "1" and the first read/write signal $(W/R)_a$ is "1", the write operation is performed in the first RAM 2039. The read permission signal RDEN is "1". The operation of the read address generator 2046 starts again to start generating the read addresses RA. The second read/write signal $(W/R)_b$ is "0". Thus, the read operation is performed in the second RAM 2049.

At the time $t_4$ when the read address RA becomes "0", the read permission signal RDEN becomes "0" and the generation of the read address RA is interrupted. Thus the second RAM 2049 enters the standby state. The selection signal BANK1 is shifted from "1" to "0". On the other hand, the first RAM 2039 keeps performing the write operation. At the time $t_5$ when the write operation of the first RAM 2039 ends, the selection signal BANK0 and the read permission signal RDEN become "1". Accordingly, the read/write signal $(W/R)_a$ becomes "0" and the second read/write signal $(W/R)_b$ becomes "1". The generation of the read addresses RA starts again and the first RAM 2039 is read.

The state for the time between $t_4$ and $t_5$ is equivalent to the state before the time $t_1$, or for the time period $T_A$ of FIG. 5.

In the first case of the third preferred embodiment, since one of the two RAMs is written while the other RAM is read, the operation of the inverse zigzag transform portion 203b is much faster than that of the inverse zigzag transform portion 203a.

Figure 8:
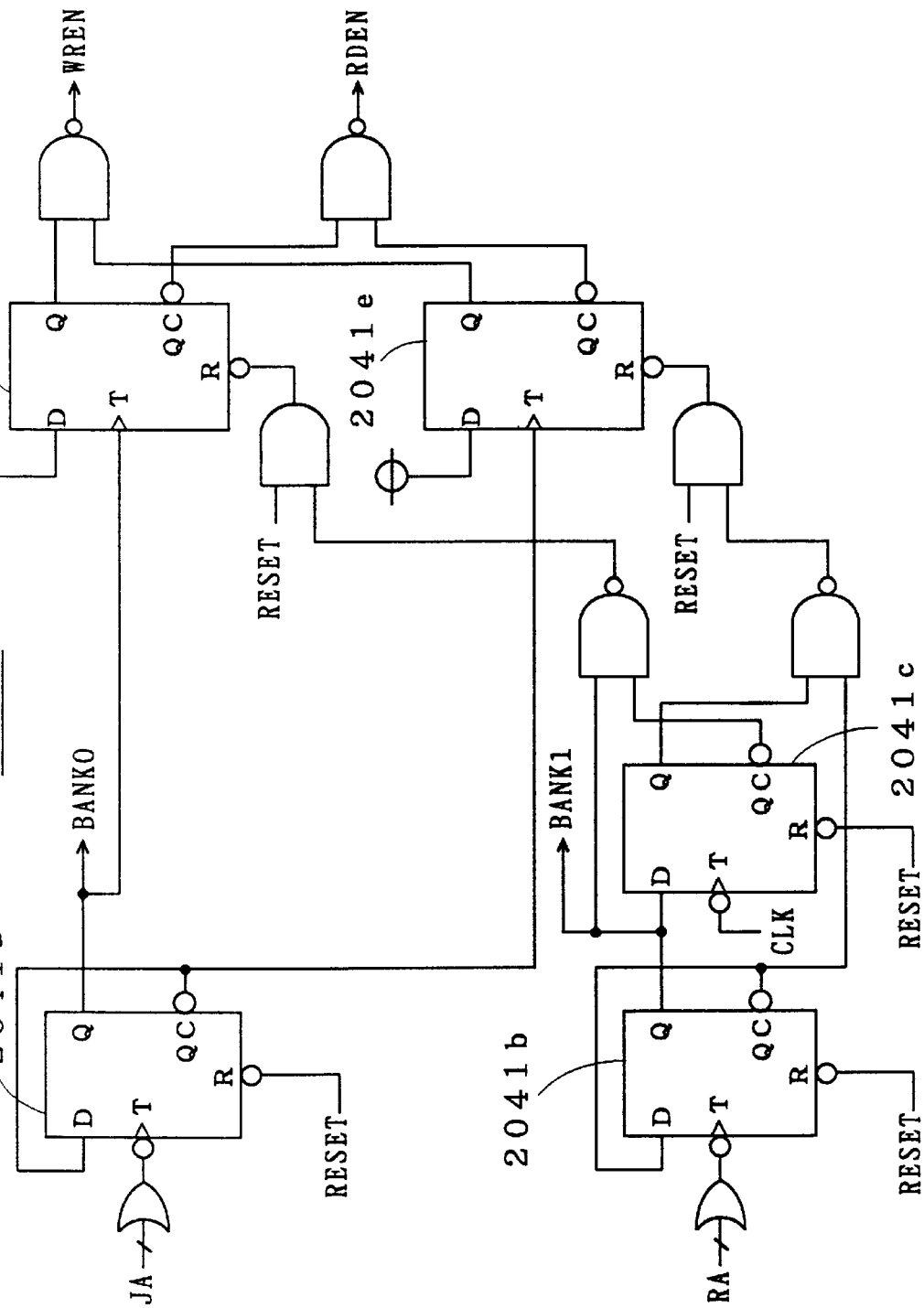
FIGS. 8 and 9 are circuit diagrams of the third preferred embodiment.

FIG. 8 is a circuit diagram showing the internal construction of the full/empty detector 2041. When all digits of the address JA are "0", a D flip-flop 2041a is triggered to invert the selection signal BANK0 which is an output therefrom. Likewise, when all digits of the read address RA are "0", a D flip-flop 2041b is triggered to invert the selection signal BANK1 which is an output therefrom.

The selection signals BANK0 and BANK1 are applied to D flip-flops 2041d and 2041c, respectively, and the write permission signal WREN and read permission signal RDEN are outputted through the processes of AND gates, NAND gates and a D flip-flop 2041e as shown.

Figure 9:
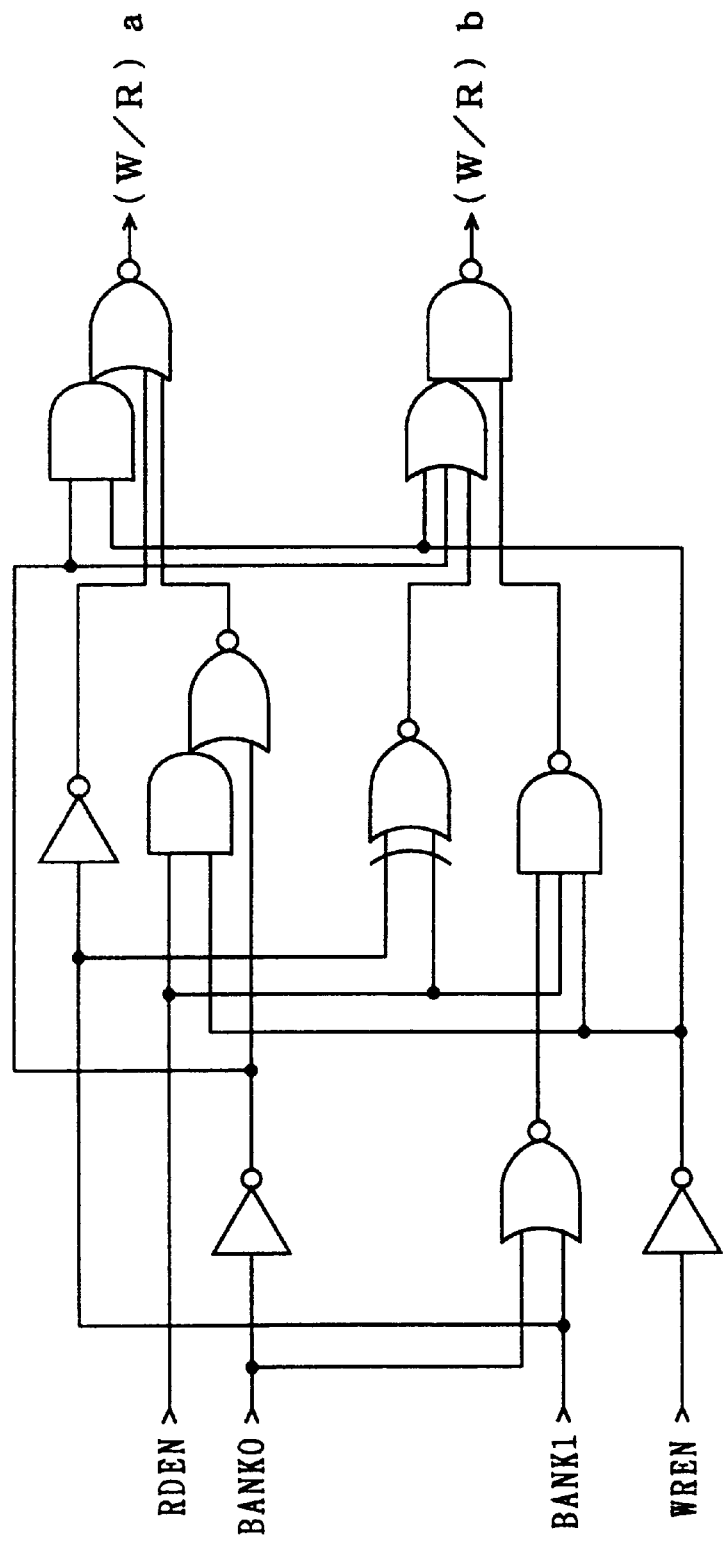

FIG. 9 is a circuit diagram of the read/write controller 2043. Production of the first and second read/write signals $(W/R)_a$ and $(W/R)_b$ from the write permission signal WREN, the read permission signal RDEN and the selection signals BANK0 and BANK1 is readily achieved by means of conventionally used logic gates.

(C-3-2-2) Second Case wherein Writing into RAM Is Faster Than Reading from RAM

As described in the second preferred embodiment, the write operation of the RAM is speeded up by writing no ineffective coefficients. Accordingly, the write operation of the RAM can be faster than the read operation thereof.

Figure 10:
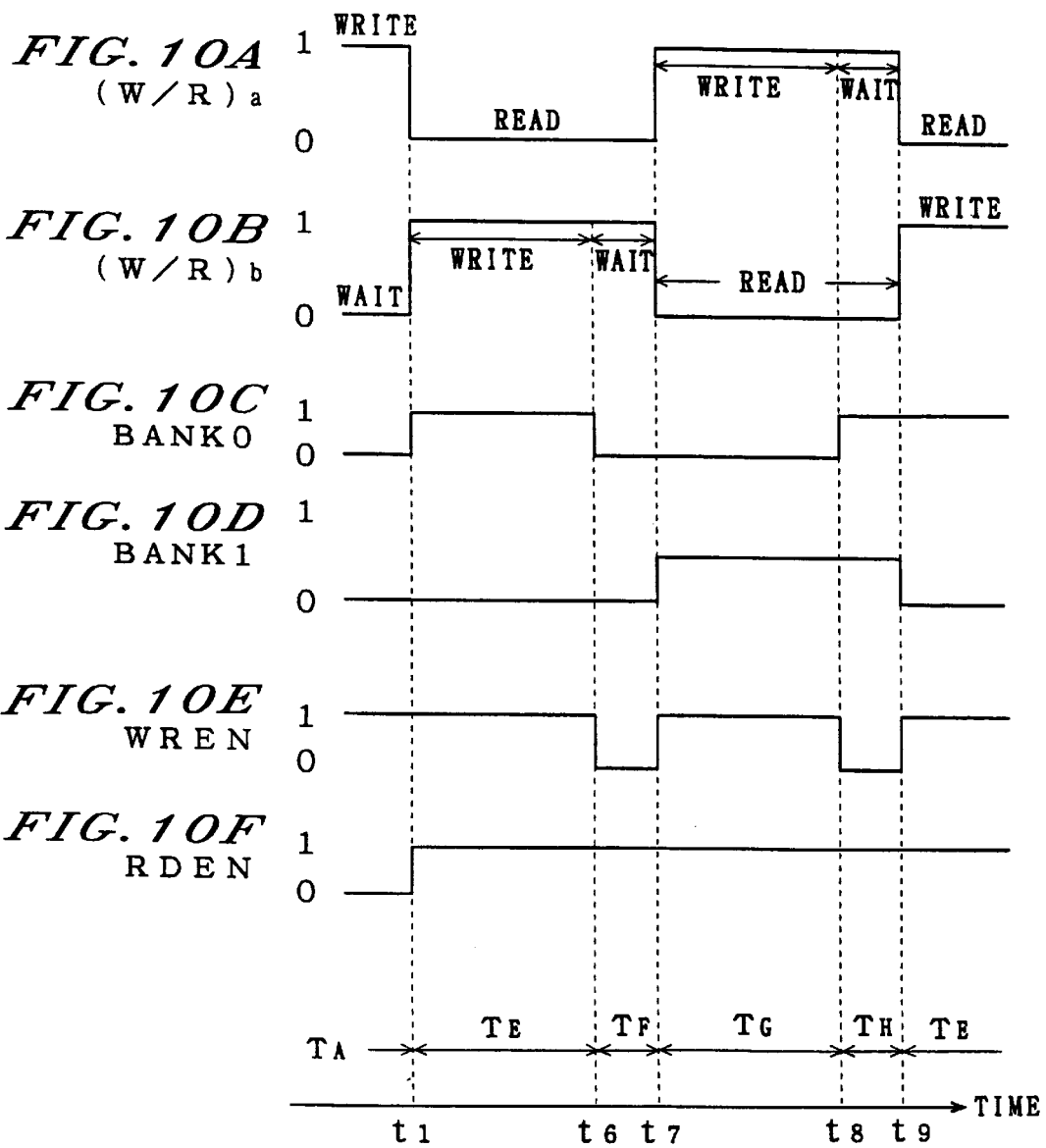
FIG. 10 is a timing chart illustrating operation in a second case of the third preferred embodiment.
Figure 11:
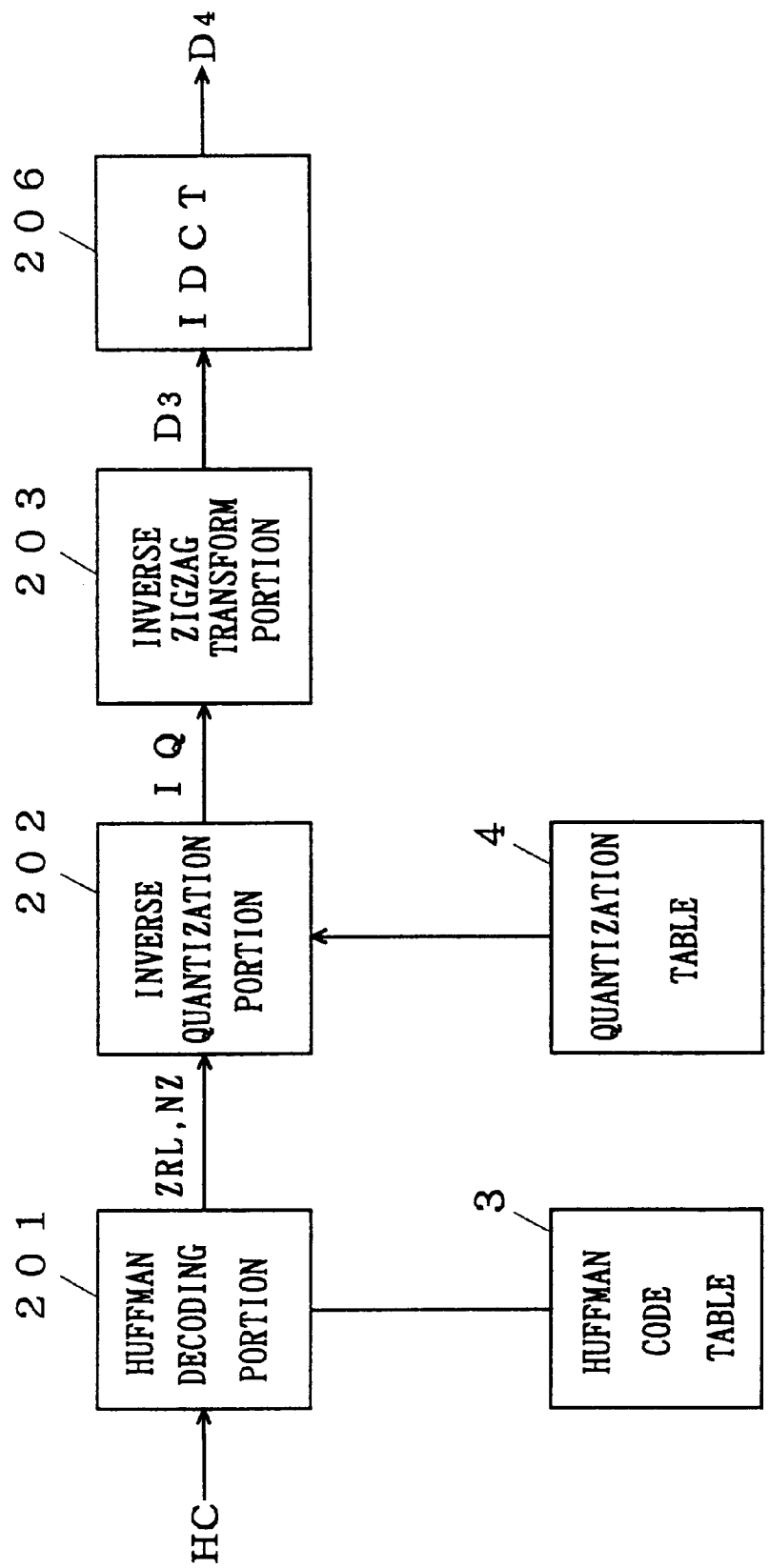
FIG. 11 is a block diagram of the background art.

FIG. 10 is a timing chart showing the operation of the inverse zigzag transform portion 203b in the second case. Initially before the time $t_1$, the first RAM 2039 is written with the multiplication result M in accordance with the address JA. The second RAM 2049 which has received no data is on standby. The time period over which the first RAM 2039 is written and the second RAM 2049 is on standby is represented as the time period $T_A$. The time period $T_A$ in the second case is equivalent to the time period $T_A$ in the first case.

When the first RAM 2039 written with all required data becomes full at the time $t_1$, the contents of the first RAM 2039 are outputted as the DCT coefficient $D_3$ in accordance with the read address RA. Specifically, the first address "0" of a group of addresses JA corresponding to the next block of Huffman codes is applied to the full/empty detector 2041. In response thereto, the selection signal BANK0 changes from "0" to "1". Thus, the read permission signal RDEN changes from "0" to "1", and the first read/write signal $(W/R)_a$ changes to "0". The first RAM 2039 then enters the read mode.

In response to the selection signal BANK0 being "1", the object to be written with a pair of address JA and multiplication result M is changed from the first RAM 2039 to the second RAM 2049. In the same manner as the first case, the second RAM 2049 is written with the address JA and the corresponding multiplication result M at the time $t_1$. That is, the read/write controller 2043 shifts the second read/write signal $(W/R)_b$ to "1" at the time $t_1$. The second RAM 2049 then enters the write mode.

In FIG. 10, the write operation of the second RAM 2049 is shown as ended at the time $t_6$, and the read operation of the first RAM 2039 is shown as ended thereafter at the time $t_7$. Time periods $T_E$ and $T_F$ are defined by the times $t_1$ to $t_6$ and the times $t_6$ to $t_7$, respectively. That is, the time period $T_E$ is a time period over which the second RAM 2049 is written and the first RAM 2039 is read. The time period $T_F$ is a time period over which the first RAM 2039 is read and the second RAM 2049 is on standby.

Upon completion of the entire write operation of the second RAM 2049 at the time $t_6$, the first value "0" of a group of addresses JA corresponding to the next block of Huffman codes is applied to the full/empty detector 2041, and the selection signal BANK0 and the write permission signal WREN are shifted from "1" to "0". The shift of the write permission signal WREN causes the Huffman decoding portion 201 and the address generator 207 to be controlled in the standby state (although control lines for the standby state are not shown in FIGS. 1 and 2 for the purpose of simplification). Thus, the address JA is interrupted with "0". The write operation of the second RAM 2049 is interrupted at the time $t_6$.

The read address RA has not yet taken a round at the time $t_6$ and has not been "0". The selection signal BANK1, accordingly, remains "0". Since the read permission signal RDEN is "1", the first RAM 2039 is still in the read mode and is read with data.

When the read address RA becomes "0" at the time $t_7$, the time period $T_F$ ends. The selection signal BANK1 is shifted to "1". Simultaneously therewith, the write permission signal WREN becomes "1", and the operation of the Huffman decoding portion 201 and address generator 207 is restored. Then the write operation of the first RAM 2039 starts again.

The first RAM 2039 is written during a time period $T_G$ defined by times $t_7$ to $t_8$. When the first RAM 2039 becomes full, the full/empty detector 2041 detects the value "0" of the address JA and shifts the selection signal BANK0 to "1". Simultaneously therewith, the write permission signal WREN is shifted to "0", and the operation of the Huffman decoding portion 201 and address generator 207 is interrupted. Hence, the first RAM 2039 is in the standby state after the time $t_8$.

Since the write operation of the RAM is faster than the read operation thereof in the second case, the second RAM 2049 is still in the read mode and keeps being read after the time $t_7$ and even after the time $t_8$. During a time period $T_H$ defined by times $t_8$ to $t_9$, the first RAM 2039 is on standby and the second RAM 2049 is in the read mode.

In the second case of the third preferred embodiment, since one of the two RAMs is written while the other RAM is read, the operation of the inverse zigzag transform portion 203b is much faster than the operation of the inverse zigzag transform portion 203a.

In the second case, the full/empty detector 2041 and the read/write controller 2043 may be achieved by the arrangements illustrated in FIGS. 8 and 9, respectively.

Unlike the first case, the operation after the time $t_9$ is not equivalent to the operation during the time period $T_A$ but is similar to the operation during the time period $T_E$. This results from the fact that the second RAM 2049 has data to be read after the time $t_9$ although it has no data to be read in the initial state.

While the invention has been shown and described in detail, the foregoing description is in all aspects illustrative and not restrictive. It is therefore understood that numerous modifications and variations can be devised without departing from the scope of the invention.

What is claimed is:

1. A signal processing device for processing an input signal including a plurality of first digits and a plurality of second digits, wherein the plurality of first digits indicate a run length of a single first value, and wherein the plurality of second digits include at least one second value other than said first value, said signal processing device comprising:

(a) an address generator comprising:
   (a-1) a first input for sequentially receiving a run length indicative of a number of contiguous first values in said input signal;
   (a-2) a second input for sequentially receiving said second digits;
   (a-3) a first output for sequentially outputting a first address updated by a value of said run length plus one; and
   (a-4) a second output for sequentially outputting said second digits in synchronism with a first address, and (b) a signal processor for performing a predetermined signal processing upon said first address and said second digits to output an array of output signals.

2. The signal processing device of claim 1, wherein said address generator further comprises:

(a-5) a "zero" detector having an input connected to said first input and an output for providing a detection signal;

(a-6) a first selector having a first end connected to said first input, a second end constantly receiving the value "1", a control end receiving said detection signal, and an output for providing one of data from said first end and data from said second end in response to said detection signal; and (a-7) an adder having a first end, a second end connected to said output of said first selector, a third end receiving said detection signal, and an output for providing a sum of values from said first, second and third ends to said first end of the adder, and
   wherein said detection signal is "0" when said run length is zero and said detection signal is "1" when said run length is not zero.

3. The signal processing device of claim 1, wherein said signal processor comprises:

(b-1) multiplier storage means for storing multipliers in relation to addresses, said multiplier storage means receiving said first address for outputting one of said multipliers corresponding to said first address; and (b-2) multiplying portion receiving said second value for multiplying said second value by said one of the multipliers and for outputting a multiplication result.

4. The signal processing device of claim 3, wherein said signal processor further comprises:

(b-3) a memory including plural storage locations for storing said first value, said memory receiving said first address and said multiplication result, and determining a second address specifying one of said plural storage locations based on said first address, and overwriting said first value stored at the one of the plural storage locations referenced by said second address with said multiplication result.

5. The signal processing device of claim 4, wherein said memory comprises:

(b-3-1) first and second storage means, previously storing said first value, for overwriting said first value stored at the one of the plural storage locations referenced by said second address with said multiplication result; and (b-3-2) second and third selectors coupled to said first and second storage means respectively, said second and third selectors selectively outputting said second address and a successively updated read address to said first and second storage means, respectively,
   wherein writing into and reading from said first and second storage means based on said second address are alternately performed by switching of said second and third selectors,
   wherein said reading from said first storage means is performed within a time period over which said writing into said second storage means is performed, and
   wherein said reading from said second storage means is performed within a time period over which said writing into said first storage means is performed.

6. The signal processing device of claim 4, wherein said memory comprises:

(b-3-1) first and second storage means, previously storing said first value, for overwriting said first value stored at the one of the plural storage locations referenced by said second address with said multiplication result; and (b-3-2) second and third selectors coupled to said first and second storage means respectively, said second and third selectors selectively outputting said second address and a successively updated read address to said first and second storage means, respectively,
   wherein writing into and reading from said first and second storage means based on said second address are alternately performed by switching of second and third selectors,
   wherein said writing into said first storage means is performed within a time period over which said reading into said second storage means is performed, and
   wherein said writing from said second storage means is performed within a time period over which said reading into said first storage means is performed.

7. A method of processing an input signal including a plurality of first digits and a plurality of second digits, wherein the plurality of first digits indicate a run length of a single first value, and wherein the plurality of second digits include at least one second value other than said first value, said method comprising the steps of:

(a) sequentially inputting a run length indicative of a number of contiguous first values in said input signal;

(b) sequentially inputting said second digits;

(c) updating a first address by a value of said run length plus one to sequentially output an updated first address; and (d) sequentially outputting said second digits in synchronism with said updated first address.

8. The method of claim 7, further comprising the steps of:

(e) inputting said updated first address to a multiplier storage means storing multipliers to provide one of said multipliers corresponding to said updated first address; and (f) multiplying said second value by said one of said multipliers to provide a multiplication result.

9. The method of claim 8, further comprising the steps of:

(g) inputting said updated first address and said multiplication result to a memory previously storing said first value;

(h) determining a second address specifying a memory location in the memory based on said updated first address; and (i) overwriting said first value stored at the memory location specified by said second address with said multiplication result.

10. The method of claim 9, further comprising the steps of:

(j) overwriting said first value stored in a first storage means at said second address with said multiplication result, wherein the first storage means previously stored said first value;

(k) overwriting said first value stored in a second storage means at said second address with said multiplication result, wherein the second storage means previously stored said first value;

(l) reading from a successively updated first memory location in said first storage means referenced by a successively updated read address, where in the step of reading reads one of said first value stored in relation to the successively updated read address and said multiplication result; and (m) reading from a successively updated first memory location in said second storage means referenced by a successively updated read address, wherein the step of reading reads one of said first value stored in relation to said successively updated read address and said multiplication result, said step (m) being executed during a time period over which said step (j) is executed, said step (l) being executed during a time period over which said step (k) is executed.

11. The method of claim 9, further comprising the steps of:

(j) overwriting said first value stored in a first storage means at said second address with said multiplication result, wherein the first storage means previously stored said first value;

(k) overwriting said first value stored in a second storage means at said second address with said multiplication result, wherein the second storage means previously stored said first value;

(l) reading from a successively updated first memory location in said first storage means referenced by a successively updated read address, wherein the step of reading reads one of said first value stored in relation to the successively updated read address and said multiplication result; and (m) reading from a successively updated second memory location in said second storage means referenced by a successively updated read address, wherein the step of reading reads one of said first value stored in relation to said successively updated read address and said multiplication result, said step (j) being executed during a time period over which said step (m) is executed, said step (k) being executed during a time period over which said step (l) is executed.

* * * * *